United States Patent
Hayatsu et al.

(12)

(10) Patent No.: US 6,201,102 B1
(45) Date of Patent: Mar. 13, 2001

(54) METHOD OF PRODUCING AN AROMATIC POLYESTER

(75) Inventors: Kazuo Hayatsu, Yokohama; Koichi Mizumoto, Tsukuba; Hiroshi Harada, Minoo, all of (JP)

(73) Assignee: Sumitomo Chemical Co., Ltd., Osaka (JP)

( * ) Notice: Subject to any disclaimer, the term of this patent is extended or adjusted under 35 U.S.C. 154(b) by 0 days.

(21) Appl. No.: 09/487,995

(22) Filed: Jan. 20, 2000

(30) Foreign Application Priority Data

Jan. 21, 1999 (JP) .................................................. 11-013196

(51) Int. Cl.⁷ ................................. C08F 6/00; C08F 2/00
(52) U.S. Cl. ...................... 528/501; 528/190; 528/194; 528/298; 528/302; 528/308.6; 526/59
(58) Field of Search .................................... 528/190, 194, 528/298, 302, 308, 308.6, 501; 526/59

(56) References Cited

FOREIGN PATENT DOCUMENTS 5-271398    10/1993   (JP) .

*Primary Examiner*—Samuel A. Acquah
(74) *Attorney, Agent, or Firm*—Pillsbury Madison & Sutro LLP

(57) ABSTRACT

A method of producing an aromatic polyester by distilling a low-boiling fraction from a polycondensation vessel containing a reaction product obtained by acetylating raw monomers of the aromatic polyester with acetic anhydride, wherein the polycondensation vessel is provided with a partial condenser, and controlling a temperature of the low-boiling fraction distilled from the partial condenser within a range from 80 to 150° C. while the amount of the low-boiling fraction distilled from the partial condenser is within a range from 50% to 90% based on a theoretical recovery amount is provided; and according to this method, adhesion of low-molecular compounds to a partial condenser in the production can be prevented and an improvement in yield of the aromatic polyester and stabilization of product quality can be accomplished.

12 Claims, No Drawings

METHOD OF PRODUCING AN AROMATIC POLYESTER

The present invention relates to a method of producing an aromatic polyester by polycondensation.

An aromatic polyester is generally obtained by acetylating raw monomers selected from aromatic hydroxycarboxylic acids, aromatic dicarboxzylic acids, aromatic diols and the like with an acetic anhydride, followed by polycondensation of them. However, this method has such a problem that low-molecular compounds such as raw monomers and acetylated monomers are adhered to distillation pipings or low-molecular compounds are contained in a recovered low-boiling fraction while low-boiling fractions such as acetic acid produced as a by-product by the acetylation reaction and polycondensation are distilled off. As a result, yield of the aromatic polyester as the product is lowered and, since the product having the same monomer formulation as that on charging is not obtained, the quality of the product does not become stable.

To solve the problem described above, JP-A-5-271398 has suggested a method in which the low-molecular compounds adhered to piping is washed and recovered by refluxing the low-boiling fraction with a partial condenser using a nitrogen gas as a coolant which is disposed before a condenser for cooling the low-boiling fraction.

However, the present inventors have found that this method is not satisfactory as an industrial production method, since the low-molecular compounds tend to be adhered to the partial condenser thereby to blockade the partial condenser due to a change in reflux amount with proceeding of the polycondensation.

An object of the present invention to provide an industrially advantageous method of producing an aromatic polyester which improve the yield of the aromatic polyester and stabilizes the product quality by preventing adhesion of low-molecular compounds to a partial condenser in a method of producing an aromatic polyester by polycondensation.

The present inventors have intensively studied about the problems described above and found that adhesion of low-molecular compounds to a partial condenser can be prevented by controlling a low-boiling fraction distilled from the partial condenser in a specific temperature range while the amount of the low-boiling fraction recovered from a polycondensation vessel is in a specific range. Thus, the present invention has been completed.

The present invention provides a method of producing an aromatic polyester by distilling a low-boiling fraction from a polycondensation vessel containing a reaction product obtained by acetylating raw monomers of the aromatic polyester with acetic anhydride, wherein the polycondensation vessel is provided with a partial condenser, and controlling a temperature of the low-boiling fraction distilled from the partial condenser within a range from 80 to 150° C. while the amount of the low-boiling fraction distilled from the partial condenser is within a range from 50% to 90% based on a theoretical recovery amount.

Examples of the raw monomers of the aromatic polyester used in the present invention include monomers such as aromatic hydroxycarboxylic acids, aromatic dicarboxylic acid, and aromatic diol.

Examples of the aromatic hydroxycarboxylic acids as the raw material include those represented by the following general formula:

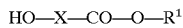

wherein $R^1$ represents hydrogen, an alkyl group having 1 to 6 carbon atoms or an aryl group having 6 to 16 carbon atoms, and X represents a divalent aromatic group. Among them, those wherein X is at least one divalent aromatic group selected from the groups represented by the following formulas (1) to (3) are preferred.

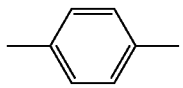
(1)

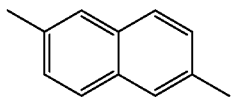
(2)

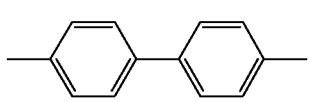
(3)

These aromatic groups represented by the formulas (1) to (3) may be optionally substituted with an alkyl, aryl, alkoxy, halogen group or the like.

Specific examples of the aromatic hydroxycarboxylic acids include p-hydroxybenzoic acid, methyl p-hydroxybenzoate, propyl p-hydroxybenzoate, phenyl p-hydroxybenzoate, benzyl p-hydroxybenzoate, p-(4-hydroxyphenyl)benzoic acid, methyl p-(4-hydroxyphenyl)benzoate, 2-hydroxy-6-naphthoic acid, methyl 2-hydroxy-6-naphthoate, and phenyl 2-hydroxy-6-naphthoate. Among them, p-hydroxybenzoic acid and 2-hydroxy-6-naphthoic acid are preferred.

Examples of the aromatic dicarboxylic acids as the raw monomer include those represented by the following general formula:

wherein $R^2$ represents hydrogen, an alkyl group having 1 to 6 carbon atoms or an aryl group having 6 to 16 carbon atoms, and Y represents a divalent aromatic group. Among them, those wherein Y is at least one divalent aromatic group selected from the groups represented by the following formulas (4) to (8) are preferred.

(4)

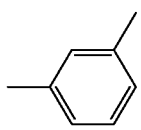
(5)

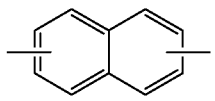
(6)

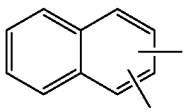

(7)

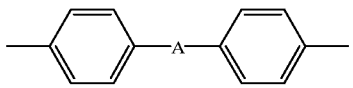

(8)

wherein A represents a direct bond, an oxygen atom, a sulfur atom, an alkyl group, a carbonyl group or a sulfonyl group. These aromatic groups represented by the formulas (4) to (8) may be optionally substituted with an alkyl, aryl, alkoxy, halogen group or the like.

Specific examples of the aromatic dicarboxylic acids include terephthalic acid, isophthalic acid, 4,4'-dicarboxydiphenyl, 1,2-bis(4-carboxyphenoxy)ethane, 2,5-dicarboxynaphthalene, 2,6-dicarboxynaphthalene, 1,4-dicarboxynaphthalene, 1,5-dicarboxynaphthalene, dimethyl terephthalate, dimethyl isophthalate, diphenyl terephthalate, diphenyl isophthalate, 4,4'-dimethoxycarbonyldiphenyl, 2,6-dimethoxycarbonylnephthalene, 1,4-dichlorocarbonylnaphthalene and 1,5-diphenoxycarbonylnaphthalene. Among them, terephthalic acid, isophthalic acid and 2,6-dicarboxynaphthalene are preferred.

Examples of the aromatic diol as the raw monomer include those represented by the following general formula:

HO—Z—OH wherein Z represents a divalent aromatic group. Among them, those wherein Z is at least one divalent aromatic group selected from the groups represented by the following formulas (9) to (12) are preferred.

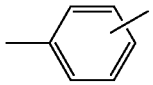

(9)

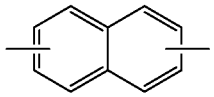

(10)

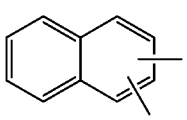

(11)

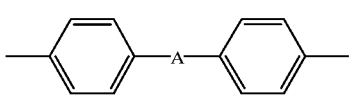

(12)

wherein A represents a direct bond, an oxygen atom, a sulfur atom, an alkyl group, a carbonyl group or a sulfonyl group. These aromatic groups may be substituted with an alkyl, aryl, alkoxy, halogen group or the like.

Specific examples of the aromatic diol include hydroquinone, resorcine, catechol, 4,4'-dihydroxydiphenyl, 4,4'-dihydroxybenzophenone, 4,4'-dihydroxydiphenylmethane, 4,4'-dihydroxydiphenylethane, 4,4'-dihydroxydiphenylether, 2,2'-bis(4-hydroxyphenyl)propane, 4,4'-dihydroxydiphenylsulfone, 4,4'-dihydroxydiphenylsulfide, 2,6-dihydroxynaphthalene, and 1,5-dihydroxynaphthalene. Among them, hydroquinone, resorcine, 4,4'-dihydroxydiphenyl, 2,2'-bis(4-hydroxyphenyl)propane and 4,4'-dihydroxydiphenylsulfone are preferred.

Although the ratio among the aromatic hydroxycarboxylic acid, aromatic dicarboxylic acid and aromatic diol used in the present invention is not specifically limited, usually the amount of the aromatic hydroxycarboxylic acid is within a range from about 30 to 80% by mole, the amount of the aromatic dicarboxylic acids is within a range from about 35 to 10% by mole and the amount of the aromatic diol is within a range from about 35 to 10% by mole, based on the total amount of the aromatic hydroxycarboxylic acids, aromatic dicarboxylic acid and aromatic diol.

In the present invention, the raw monomer is acetylated by reacting acetic anhydride with a hydroxyl group of the raw monomers, and the acetylated reaction product is polycondensed to produce the aromatic polyester.

The temperature and pressure of the acerylation reaction are not specifically limited as far as the acetylation reaction solution is refluxed, but the acetylation reaction is usually carried out at about 140 to 150° C. under normal pressure. If the reaction temperature does not reach the reflux temperature, the reaction time tends to be prolonged. The acetylation reaction is usually carried out for about 1 to 5 hours after the beginning of the reflux.

The acetylated reaction product obtained by the acetylation reaction is usually a solution containing unreacted raw monomers, acetylated raw monomers, acetic acid, and unreacted acetic anhydride.

The acetylated reaction product is usually transferred to a polycondensation vessel, where the polycondensation is carried out. The polycondensation vessel may be the same as the acetylation reaction vessel.

While carrying out the polycondensation in the present invention, the low-boiling fraction is distilled off from the polycondensation vessel.

In the polycondensation, usually, the thermal medium for the polycondensation vessel is gradually heated to about 270–350° C. under normal pressure and then almost the same temperature is maintained for about 0 to 5 hours.

When the final temperature of the thermal medium in the polycondensation vessel is lower than 270° C., the polycondensation tends to be retarded. On the other hand, when the thermal medium is maintained at a temperature higher than 350° C., by-products such as decomposition of the resulting aromatic polyester tend to be produced.

The low-boiling fraction distilled from the polycondensation vessel includes, for example, acetic acid, unreacted acetic anhydride and other low-molecular compounds. Acetic acid, water, alcohol and phenol, which are generated in the polycondensation reaction, may also be contained in the low-boiling fraction. Examples of the other low-molecular compound include the raw monomers such as aromatic carboxylic acid and the acetylated raw monomers. When a large amount of the low-molecular compound is distilled off from the polycondensation vessel, the yield of the desired aromatic polyester is lowered and a product having the same formulation as that of the raw monomers on charging can not be obtained, thereby causing problems such as unstable product quality, which is not preferred.

The partial condenser used in the present invention is disposed between a polycondensation vessel, and a condenser for cooling the low-boiling fraction. The large portion of the low-boiling fraction is cooled and condensed via the condenser and then recovered out of the polycondensation vessel, while almost all of the low-molecular compound in the low-boiling fraction is condensed in the partial condenser and then recovered in the polycondensation vessel.

In the present invention, while the amount of the low-boiling fraction cooled and recovered via the condenser (hereinafter referred to as a recovered low-boiling fraction) is within a range from about 50% to 90% based on a theoretical recovery amount of the low-boiling fraction, the temperature of the low-boiling fraction distilled from the partial condenser to the condenser (hereinafter referred to as a distillation temperature) is controlled at a temperature within a range from about 80 to 150° C., preferably 100 to 150° C.

The theoretical recovery amount, as used herein, refers to the total weight of the acetic acid and the unreacted acetic anhydride, which are obtained on assumption that all hydroxyl groups of the raw monomers are acetylated and then all acetyl groups are polycondensated, and the alcohol and phenol which are obtained on such assumption that all ester groups of the raw monomers are polycondensated. The recovered low-boiling fraction refers to the amount of the low-boiling fraction which was distilled from the polycondensation vessel and is cooled and recovered in the condenser.

When the amount of the recovered low-boiling fraction does not reach about 50% by weight based on the theoretical recovery amount, the amount of the low-boiling fraction to be refluxed in the partial condenser is large even if the distillation temperature is not controlled within the above temperature range. Therefore, the low-molecular compound is recovered in the polycondensation vessel without being adhered, the low-molecular compound is hardly distilled off, together with the recovered low-boiling fraction, and the distillation temperature may be controlled either within or out of the above temperature range.

At the time where the amount of the recovered low-boiling fraction exceeds about 90% by weight based on the theoretical recovery amount, almost all of the low-molecular compound has been polycondensed and, therefore, adhesion and distillation off together with the recovered low-boiling fraction hardly occur. The distillation temperature tends to be lowered because the amount of the low-boiling fraction distilled from the polycondensation vessel is small.

After the amount of the recovered low-boiling fraction exceeds about 90% by weight based on the theoretical recovery amount, the polycondensation reaction may be carried out under a reduced pressure so as to sufficiently distill off acetic acid.

If the distillation temperature does not reach about 80° C. while the amount of the recovered low-boiling fraction is within a range from 50% to 90% based on a theoretical recovery amount, the amount of the low-molecular compound adhered to the partial condenser tends to be increased, which is not preferred. When the distillation temperature exceeds about 150° C. while the amount of the recovered low-boiling fraction is within a range from 50% to 90% based on a theoretical recovery amount, the low-molecular compound is distilled off together with the recovered low-boiling fraction, without being recovered in the partial condenser, and the low-molecular compound is adhered to the partial condenser or condenser, which is not preferred.

To control the distillation temperature within the range from about 80 to 150° C., preferably 100 to 150° C., the coolant of the partial condenser is usually controlled at a temperature within a range from about 80 to 150° C., preferably from 100 to 150° C., and more preferably from 110 to 130° C.

When the coolant temperature of the partial condenser is not controlled within a range from about 80 to 150° C., it is usually difficult to control the distillation temperature within the above range.

Shape of the polycondensation vessel and the blade thereof may be those commonly known. In case of a vertical stirring vessel, for example, a multi-step paddle blade, turbine blade, double-helical blade, anchor blade, and comb-shaped blade are used.

To enhance the reaction rate of the polycondensation, a catalyst may be used. Examples of the catalyst include metal oxide and organometal salt. Specific examples thereof include oxides, acetates, and oxalates of germanium, tin, titanium, antimony, cobalt or manganese.

The following Examples further illustrate the present invention in detail, but are not to be construed to limit the scope thereof.

Measuring procedure of low-boiling fraction

High performance liquid chromatography: Using methanol/acetic acid (volume ratio:1000/5) and water/acetic acid (volume ratio:1000/5) as a mobile phase, the low-boiling fraction was measured by a multi-solvent delivery system 600E manufactured by Waters Co. in accordance with a low-pressure gradient process. A column used is an octadecylsilyl (ODS) column having an inner diameter of 6.0 mm and a length of 15 cm. Quantitative calculation was conducted by an absolute calibration curve process.

EXAMPLE 1

Acetylation Reaction

In a flask equipped with a water-cooled Liebig condenser tube, a thermometer, a nitrogen introducing tube and a anchor stirring blade, 773 parts by weight of p-hydroxybenzoic acid (5.60 mole, hereinafter referred to as POB), 347 parts by weight of 4,4'-dihydroxydiphenyl (1.87 mole, hereinafter referred to as DOD), 232 parts by weight of terephthalic acid (1.40 mole, hereinafter referred to as TPA), 78 parts by weight of isophthalic acid (0.47 mole, hereinafter referred to as IPA) and 1000 parts by weight of acetic anhydride (9.80 mole, hereinafter referred to as Ac2O) were charged. The temperature was raised while stirring the solution in the flask until the solution was refluxed at 145° C., followed by stirring for 3 hours under a refluxed state to obtain an acetylated reaction product.

Polycondensation

Then, the above condenser tube was replaced with a partial condenser (hose condenser tube) through which a coolant adjusted to 119° C. flows, and then a water-cooled condenser (Liebig condenser tube) was connected to the partial condenser. The flask was heated to 320° C. at a heating rate of 1° C./minute and, after stirring continuously at the same temperature for 60 minutes, the polycondensation was completed. The low-boiling fraction which was distilled off and cooled in the condenser via the partial condenser was recovered in the amount of 1165 parts by weight (99.5% based on the theoretical recovery amount).

While the amount of the recovered low-boiling fraction is within a range from 584 parts by weight (50% based on the theoretical recovery amount) to 1052 parts by weight (90% based on the theoretical recovery amount), the coolant of the partial condenser is heated to about 119° C. and the distillation temperature was controlled within a range from 108 to 145° C. During this operation, adhesion to the partial condenser and condenser was not recognized.

The distillation temperature reached 145° C. when the amount of the recovered low-boiling fraction reached 855 parts by weight (73% based on the theoretical recovery amount). Thereafter, the temperature lowered in order and then lowered to 50° C. on completion of the polycondensation. After the completion of the polycondensation, adhesion was not recognized in the partial condenser and condenser, which were checked after removing them from the flask.

2.6 Parts by weight (0.21% based on the theoretical yield of the aromatic polyester) of acetylated 4,4'-diacetoxydiphenyl (hereinafter referred to as DOD-Ac) is contained in the recovered low-boiling fraction, but other monomers were not detected.

EXAMPLES 1 TO 2 AND COMPARATIVE EXAMPLES 1 TO 3

The same operation as in Example 1 was repeated, except for changing the conditions described in Table 1. The results are summarized in Table 1.

A partial condenser outlet temperature while the amount of the low-boiling fraction distilled from the partial condenser is within a range from 50% to 90% based on a theoretical recovery amount was taken as a distillation temperature. In Comparative Example 3, a condenser inlet temperature is taken as the distillation temperature.

With respect to adhesion of the low-boiling compound to the partial condenser, the results of visual evaluation were shown as adhesion to the partial condenser.

O: The low-molecular compound was hardly adhered.

X: Recovery of the low-boiling fraction was continued, but the low-molecular compound was adhered to the partial condenser.

XX: The partial condenser was blocked with the low-molecular compound, thereby making it impossible to recover the low-boiling fraction.

When adhesion to the partial condenser was recognized, the low-boiling fraction recovery amount before adhesion, based on the theoretical recovery amount, was taken as a low-boiling fraction recovery (% by weight) on adhesion.

The content (parts by weight) of the low-molecular compound in the recovered low-boiling fraction, and its weight ratio (%) based on the theoretical yield of the aromatic polyester were also shown.

In Comparative Example 1, the partial condenser was blocked when the low-boiling fraction was recovered in 84% based on the theoretical amount, thereby making it impossible to recover the low-boiling fraction. Therefore, the polycondensation was terminated at this time.

TABLE 1

|  |  |  | Example 1 | Example 2 | Comparative example 1 | Comparative example 2 | Comparative example 3 |
|---|---|---|---|---|---|---|---|
| Charge amount | POB | Parts | 773 | 540 | 773 | 773 | 773 |
|  |  | (molar ratio) | (5.60) | (5.88) | (5.60) | (5.60) | (5.60) |
|  | DOD | Parts | 347 | 243 | 347 | 347 | 347 |
|  |  | (molar ratio) | (1.87) | (1.96) | (1.87) | (1.87) | (1.87) |
|  | TPA | Parts | 232 | 163 | 232 | 232 | 232 |
|  |  | (molar ratio) | (1.40) | (1.47) | (1.40) | (1.40) | (1.40) |
|  | IPA | Parts | 78 | 54 | 78 | 78 | 78 |
|  |  | (molar ratio) | (0.47) | (0.49) | (0.47) | (0.47) | (0.47) |
|  | Ac2O | Parts | 1000 | 1000 | 1000 | 1000 | 1000 |
|  |  | (molar ratio) | (9.80) | (9.80) | (9.80) | (9.80) | (9.80) |
| Distillation temperature |  | ° C. | 108–145 | 120–135 | 136–180 | 160–183 | 120–275 |
| Partial condenser coolant temperature |  | ° C. | 119 | 115 | 25 (Nitrogen) | 200 | None |
| Low-molecular compound | Adhesion to partial condenser |  | o | o | xx | x | x |
|  | Low-boiling fraction recovery on adhesion |  | — | — | 75% | 81% | 73% |
|  | Content in recovered low-boiling fraction | Parts (%) | 2.6 0.21 | 3.6 0.40 | Not measured Not measured | Not measured Not measured | 12.6 1.00 |
| Theoretical yield |  | (Parts) | 1263 | 882 | 1263 | 1263 | 1263 |

1): provided with no partial condenser

According to the present invention, adhesion of low-molecular compounds to a partial condenser in the production of an aromatic polyester can be prevented and an improvement in yield of the aromatic polyester as a product and stabilization of product quality can be accomplished. Therefore, the present invention is advantageous as a method of producing an aromatic polyester in an industrial scale.

What is claimed is:

1. A method of producing an aromatic polyester by distilling a low-boiling fraction from a polycondensation vessel containing a reaction product obtained by acetylating raw monomers of the aromatic polyester with acetic anhydride, wherein
   the polycondensation vessel is provided with a partial condenser, and
   controlling a temperature of the low-boiling fraction distilled from the partial condenser within a range from 80 to 150° C. while the amount of the low-boiling fraction distilled from the partial condenser is within a range from 50% to 90% based on a theoretical recovery amount.

2. The method according to claim 1, wherein the raw monomers of the aromatic polyester is at least one monomer selected from the group of consisting of aromatic hydroxycarboxylic acids, aromatic dicarboxylic acid and aromatic diol.

3. The method according to claim 2, wherein the amount of the aromatic hydroxycarboxylic acid is within a range from about 30 to 80% by mole, the amount of the aromatic dicarboxylic acids is within a range from about 35 to 10% by mole and the amount of the aromatic diol is within a range from about 35 to 10% by mole, based on the total amount of the aromatic hydroxycarboxylic acids, aromatic dicarboxylic acid and aromatic diol.

4. The method according to claim 2, wherein the aromatic hydroxycarboxylic acid is represented by the following formula:

HO—X—CO—O—R$^1$ wherein R$^1$ represents hydrogen, an alkyl group having 1 to 6 carbon atoms or an aryl group having 6 to 16 carbon atoms, and X represents a divalent aromatic group.

5. The method according to claim 4, wherein X is at least one divalent aromatic group selected from the groups represented by the following formulas (1) to (3):

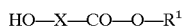
(1)

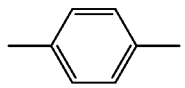
(2)

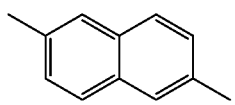
(3)

6. The method according to claim 4, wherein the aromatic hydroxycarboxylic acid is at least one compound selected from the group consisting of p-hydroxybenzoic acid and 2-hydroxy-6-naphthoic acid.

7. The method according to claim 2, wherein the aromatic dicarboxylic acid is represented by the following formula:

R$^2$—O—CO—Y—CO—O—R$^2$ wherein R$^2$ represents hydrogen, an alkyl group having 1 to 6 carbon atoms or an aryl group having 6 to 16 carbon atoms, and Y represents a divalent aromatic group.

8. The method according to claim 7, wherein Y is at least one divalent aromatic group selected from the groups represented by the following formulas (4) to (8):

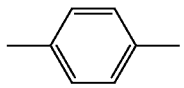
(4)

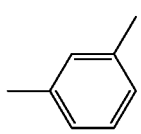
(5)

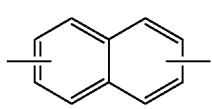
(6)

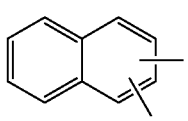
(7)

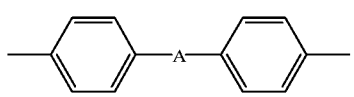
(8)

wherein A represents a direct bond, an oxygen atom, a sulfur atom, an alkyl group, a carbonyl group or a sulfonyl group.

9. The method according to claim 7, wherein the aromatic dicarboxylic acids is at least one compound selected from the group consisting of terephthalic acid, isophthalic acid and 2,6-dicarboxynaphthalene.

10. The method according to claim 2, wherein the aromatic diol is represented by the following formula:

HO—Z—OH wherein Z represents a divalent aromatic group.

11. The method according to claim 10, wherein Z is at least one divalent aromatic group selected from the groups represented by the following formulas (9) to (12):

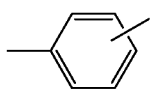
(9)

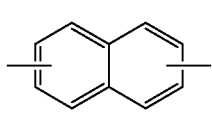
(10)

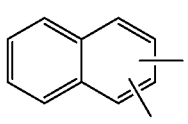
(11)

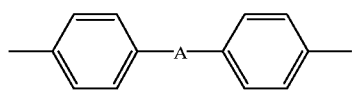
(12)
wherein A represents a direct bond, an oxygen atom, a sulfur atom, an alkyl group, a carbonyl group or a sulfonyl group.
12. The method according to claim 10, wherein the aromatic diol is a compound selected from the group consisting of hydroquinone, resorcine, 4,4'-dihydroxydiphenyl, 2,2'-bis(4-hydroxyphenyl)propane and 4,4'-dihydroxydiphenylsulfone.
* * * * *